(12) United States Patent
Nagasawa

(10) Patent No.: US 11,084,449 B2
(45) Date of Patent: Aug. 10, 2021

(54) PASSENGER PROTECTION APPARATUS

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 52 days.

(21) Appl. No.: 16/411,295

(22) Filed: May 14, 2019

(65) Prior Publication Data
US 2020/0101927 A1    Apr. 2, 2020

(30) Foreign Application Priority Data

Sep. 28, 2018   (JP) .............................. JP2018-185722

(51) Int. Cl.
*B60R 21/237*       (2006.01)
*B60R 21/264*       (2006.01)
(Continued)

(52) U.S. Cl.
CPC .......... *B60R 21/231* (2013.01); *B60R 21/207* (2013.01); *B60R 21/2155* (2013.01); *B60R 21/237* (2013.01); *B60R 21/264* (2013.01); *B60R 2021/0004* (2013.01); *B60R 2021/23107* (2013.01); *B60R 2021/23146* (2013.01);
(Continued)

(58) Field of Classification Search
CPC ... B60R 21/231; B60R 21/207; B60R 21/237; B60R 21/264; B60R 21/26; B60R 21/2346; B60R 21/2334; B60R 21/23; B60R 2021/0004; B60R 2021/23146; B60R 2021/26029; B60R 2021/26094; B60R 2021/23107; B60R 2021/161

USPC ...... 280/728.1, 730.1, 730.2, 736, 740, 742, 280/743.1
See application file for complete search history.

(56) References Cited

U.S. PATENT DOCUMENTS 3,981,518 A    9/1976  Pulling
5,333,899 A    8/1994  Witte
(Continued)

FOREIGN PATENT DOCUMENTS

CN    111819113 A    10/2020
FR    2 927 592 A1    8/2009
(Continued)

OTHER PUBLICATIONS

Japanese Decision to Grant a Patent dated Sep. 17, 2019 for Japanese Patent Application No. 2018-185722 (3 Pages, with English translation).
(Continued)

*Primary Examiner* — Keith J Frisby
(74) *Attorney, Agent, or Firm* — Smith, Gambrell & Russell, LLP

(57) ABSTRACT

A passenger protection apparatus for a vehicle includes an inflator and an airbag body. The inflator is configured to generate gas upon receiving a predetermined actuating signal. The airbag body is folded and configured to deploy by supplying the gas from the inflator to the airbag body. The airbag body includes a predetermined area on which adhesive is applied. An adhesive force of the adhesive is exerted by heat of the gas from the inflator during deployment of the airbag body, so that the predetermined area adheres to an adherend at a desired position.

11 Claims, 12 Drawing Sheets

(51) Int. Cl.
  *B60R 21/231* (2011.01)
  *B60R 21/207* (2006.01)
  *B60R 21/2155* (2011.01)
  *B60R 21/00* (2006.01)
  *B60R 21/26* (2011.01)

(52) U.S. Cl.
  CPC ........... *B60R 2021/26029* (2013.01); *B60R 2021/26094* (2013.01)

(56) References Cited

U.S. PATENT DOCUMENTS

| | | |
|---|---|---|
| 5,499,840 A | 3/1996 | Nakano |
| 6,247,727 B1 | 6/2001 | Hamada et al. |
| 7,134,685 B2 | 11/2006 | Panagos et al. |
| 7,163,236 B2 | 1/2007 | Masuda et al. |
| 7,571,931 B2 | 8/2009 | Watanabe |
| 7,681,907 B2 | 3/2010 | Svenbrant et al. |
| 8,882,138 B1 | 11/2014 | Hicken et al. |
| 9,290,151 B2 | 3/2016 | Fujiwara |
| 9,428,136 B2 | 8/2016 | Ishida et al. |
| 9,487,177 B2 | 11/2016 | Schneider et al. |
| 9,731,677 B1 | 8/2017 | Belwafa et al. |
| 9,862,347 B2 | 1/2018 | Deng et al. |
| 9,975,519 B2 | 5/2018 | Kobayashi |
| 10,246,043 B2 | 4/2019 | Schneider |
| 10,300,880 B2 | 5/2019 | Mihm |
| 10,800,368 B2 | 10/2020 | Kitagawa |
| 10,875,486 B2 | 12/2020 | Kim |
| 2004/0232681 A1 | 11/2004 | Adomeit |
| 2005/0121889 A1 | 6/2005 | Enders et al. |
| 2006/0255572 A1 | 11/2006 | Svenbrandt et al. |
| 2007/0013177 A1 | 1/2007 | Abe |
| 2016/0039383 A1 | 2/2016 | Hicken et al. |
| 2016/0288762 A1 | 10/2016 | Deng et al. |
| 2017/0355342 A1 | 12/2017 | Deng et al. |
| 2018/0056920 A1 | 3/2018 | Paxton et al. |
| 2018/0162310 A1 | 6/2018 | Szawarski et al. |
| 2018/0222432 A1 | 8/2018 | Schneider |
| 2019/0023214 A1 | 1/2019 | Kitagawa |
| 2019/0283703 A1 | 9/2019 | Marciniak |
| 2019/0389420 A1 | 12/2019 | Dry et al. |
| 2020/0101921 A1 | 4/2020 | Nagasawa |
| 2020/0101930 A1 | 4/2020 | Nagasawa |
| 2020/0101931 A1 | 4/2020 | Nagasawa |

FOREIGN PATENT DOCUMENTS

| | | | |
|---|---|---|---|
| FR | 2927592 A1 | * | 8/2009 |
| JP | 07246898 A | * | 9/1995 |
| JP | H07-232615 A | | 9/1995 |
| JP | 2007-022306 A | | 2/2007 |
| JP | 2009-154812 A | | 7/2009 |
| JP | 2010-047182 | | 3/2010 |
| JP | 2010-132268 A | | 6/2010 |
| JP | 2013-18378 A | | 1/2013 |
| JP | 2015-112973 A | | 6/2015 |

OTHER PUBLICATIONS

Final Office Action dated Mar. 22, 2021 for U.S. Appl. No. 16/432,103 (12 Pages).

Non-Final Office Action dated Mar. 19, 2021 for U.S. Appl. No. 16/445,345 (10 pages).

* cited by examiner

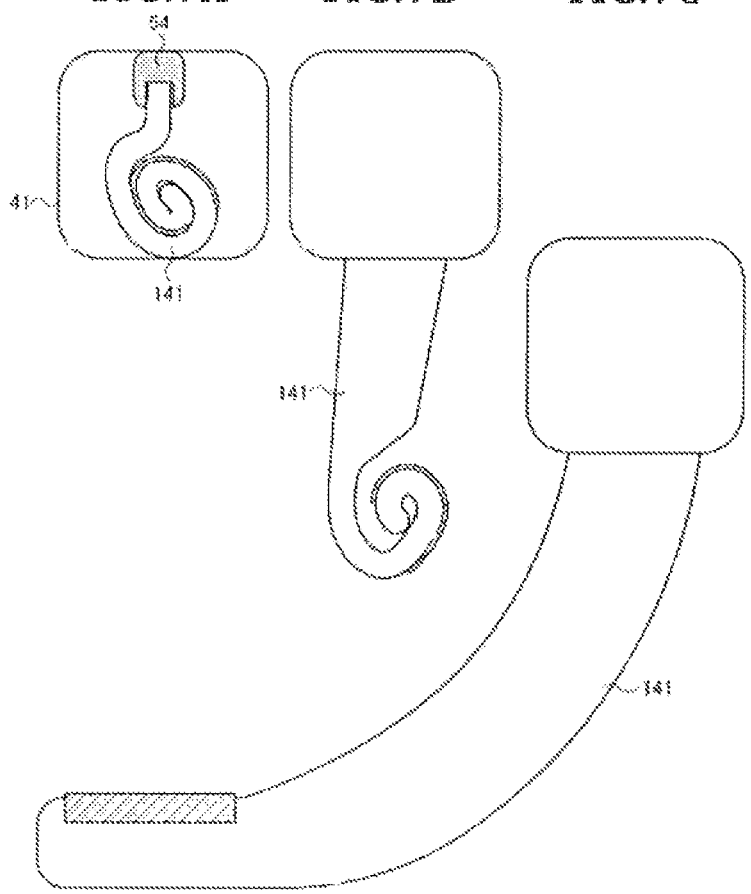

ical Application No. 2018-185722 filed on
PASSENGER PROTECTION APPARATUS

CROSS-REFERENCE TO RELATED APPLICATIONS

The present application claims priority from Japanese Unexamined Patent Application No. 2018-185722 filed on Sep. 28, 2018, and the entire contents of which are hereby incorporated by reference.

BACKGROUND

The disclosure relates to a passenger protection apparatus.

In order to protect a passenger from a collision and so forth, an airbag apparatus has been used in a vehicle such as an automobile. As this airbag apparatus, a front airbag configured to deploy backward in front of the passenger has been known. This front airbag is deployed at a frontal collision of the vehicle to support and protect the passenger moving forward.

In addition, in order to protect against a side collision, there is an increasing demand for vehicles equipped with side airbags and curtain airbags. This curtain airbag is used to hold the internal pressure for a period of time, several seconds while the vehicle overturns, in order to absorb the impact to the head, and therefore there is a demand for improvement of the airtightness of the airbag and lengthen the expansion duration of the airbag. To address this demand, an airbag having improved strength and airtightness of a joined part with adhesive has been proposed, for example, in Japanese Unexamined Patent Application Publication No. 2010-047182.

SUMMARY

An aspect of the disclosure provides a passenger protection apparatus for a vehicle including an inflator and an airbag body. The inflator is configured to generate gas upon receiving a predetermined actuating signal. The airbag body is folded and configured to deploy by supplying the gas from the inflator to the airbag body. The airbag body includes a predetermined area on which adhesive is applied. An adhesive force of the adhesive is exerted by heat of the gas from the inflator during deployment of the airbag body, so that the predetermined area adheres to an adherend at a desired position.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 7A is a top cross-sectional view illustrating an airbag body stored;

FIG. 7B and FIG. 7C are top views illustrating the airbag body deploying;

DETAILED DESCRIPTION

Figure 1:
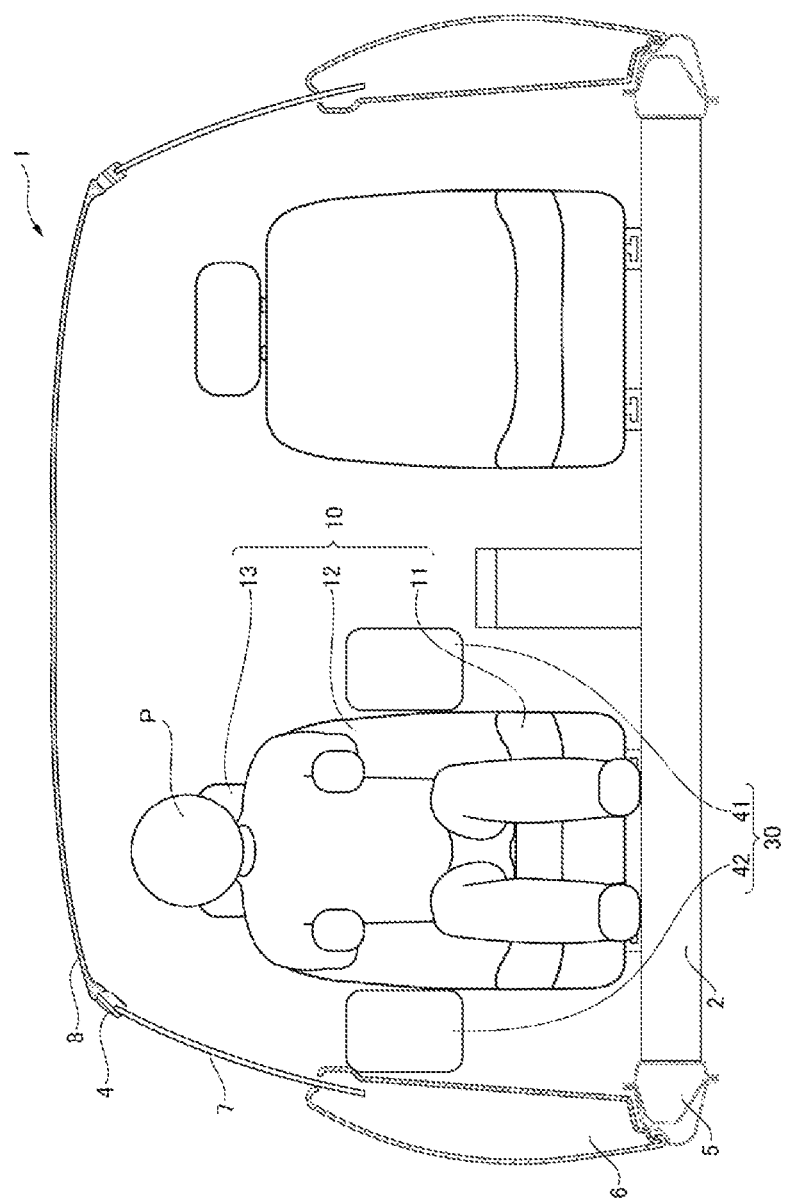
FIG. 1 is a cross-sectional view schematically illustrating a vehicle equipped with passenger protection apparatuses according to an embodiment of the disclosure.

In the following, some embodiments of the disclosure are described in detail with reference to the accompanying drawings. Note that sizes, materials, specific values, and any other factors illustrated in respective embodiments are illustrative for easier understanding of the disclosure, and are not intended to limit the scope of the disclosure unless otherwise specifically stated. Further, elements in the following example embodiments which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale. Collisions of the vehicle are not limited to a frontal collision and a lateral collision, but various types of collisions in any direction, such as an oblique collision, are conceivable. However, it may not be possible to prepare airbags for each type of collision, because of the high cost and so forth. For example, the motion of the passenger is varied depending on the various types of collisions as described above, and therefore it is difficult for the airbag to surely hold the passenger in an exact contact area that allows the airbag to maximally absorb the collision energy. Consequently, it may not be possible to successfully protect the passenger.

It is desirable to provide a passenger protection apparatus capable of improving the protection performance by surely holding the passenger regardless of varied motions of the passenger due to various types of collisions.

Figure 2A:
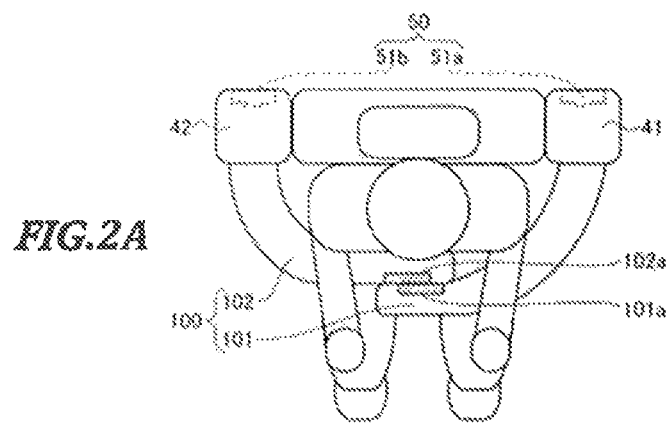
FIG. 2A is a top view illustrating a deployed airbag body of each of the passenger protection apparatuses according to the embodiment.
Figure 2B:
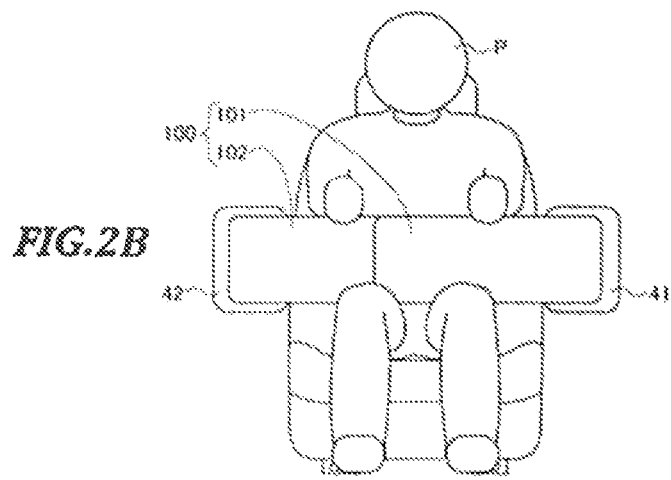
FIG. 2B is a front view illustrating a deployed airbag body of each of the passenger protection apparatuses according to the embodiment.

FIG. 1 is a cross-sectional view schematically illustrating a vehicle equipped with passenger protection apparatuses according to an embodiment of the disclosure. FIG. 2A is a top view illustrating airbag bodies deployed by actuating the passenger protection apparatuses of the embodiment. FIG.

2B is a front view illustrating the airbag bodies deployed by actuating the passenger protection apparatuses of the embodiment.

<Configuration of Vehicle 1>

As illustrated in FIG. 1, seats 10 are provided on a floor surface 2 (on which a floor panel of an under body is mounted) of a vehicle 1. In addition, right and left center pillars forming inside walls of the vehicle body are provided facing one another outside the floor surface 2 in the vehicle width direction. The upper end of each of the center pillars is integrally coupled to a roof side rail 4, and the lower end of the center pillar is integrally coupled to a side sill 5. A front door 6 is provided in front of the center pillar, and a front door window 7 is provided above the front door 6. Moreover, a roof 8 is provided approximately horizontally above the roof side rails 4.

A passenger protection apparatus 30 is provided with each of the seats 10. The passenger protection apparatus 30 for the right seat 10 and the passenger protection apparatus 30 for the left seat 10 are symmetric. Hereinafter, the passenger protection apparatus 30 for the right seat 10 (the left side in FIG. 1) will be described as an example.

The seat 10 includes a seat cushion (seat bottom) 11 on which the hip and thighs of a passenger P rest, a seat back (backrest) 12 configured to recline, and a head rest (head portion) 13 configured to support the head of the passenger P.

<Configuration of Passenger Protection Apparatus 30>

The passenger protection apparatus 30 is controlled by, for example, an ACU (airbag deployment control unit) and an ECU (electronic control unit), based on detection signals from a collision detector for detection and prediction of a collision of the vehicle 1. The passenger protection apparatus 30 includes an inflator 50 and an airbag body 100.

<Inflator 50 >

The inflator 50 ignites explosives upon receiving an actuating signal sent based on the detection of a collision of the vehicle 1 by the collision detector, or the prediction of a collision, and generates gas by the chemical reaction due to combustion. The gas generated by the inflator 50 is injected into the airbag body 100. The inflator 50 includes a first inflator 51a and a second inflator 51b described later.

<Airbag Body 100>

The airbag body 100 has a pouch shape into which the gas is injected by the inflator 50. When the airbag body 100 is not actuated, it is compactly folded. To actuate the airbag body 100, the inflator 50 injects the gas into the folded airbag body 100, so that the airbag body 100 is deployed to surround the sitting position of the passenger P. For example, the cloth of the inward side of the airbag body 100 facing the passenger P is shorter than the cloth of the outward side opposite to the passenger P, so that the airbag body 100 can deploy to surround the passenger P. The airbag body 100 includes an inward cloth section facing the passenger P, and an outward cloth section approximately opposite to the inward cloth section. Each of the inward cloth section and the outward cloth section has a base end portion into which the gas is injected, and a leading end portion. The base end portion and the leading end portion of the inward cloth section are partially sewn on one another outside the airbag body 100 by a tether with an adjusted length. By this mean, it is possible to deploy the airbag body 100 to surround the passenger P. In the airbag body 100, a tether to control the width of the airbag body 100 is provided between the inward cloth section and the outward cloth section. The airbag body 100 has two configurations: configuration A where the base end portion of the inward cloth section is sewn on the leading end portion of the outward cloth section by a tether; and configuration B where the base end portion of the inward cloth section is sewn on the leading end portion of the outward cloth section by the tether at a position closer to the front end than the configuration A. Moreover, the tether is shorter than the length of the airbag body 100 deployed without using the tether, from the point of the outward cloth section facing the point at which the tether is sewn on the base end portion of the inward cloth section to the point at which the tether is sewn on the front end portion of the outward cloth section. By this means, it is possible to deploy the airbag body 100 to surround the passenger P. In this case, the inward cloth section may be shorter than the outward cloth section. Alternatively, the airbag body 100 may bent only in the configuration A, or may be bent in the configuration B in addition to the configuration A in multiple stages. Here, the airbag body 100 includes a first airbag body 101 and a second airbag body 102 described later.

When the passenger protection apparatuses 30 are not actuated, they are stored in a first storage case 41 and a second storage case 42, respectively. The first storage case 41 is provided on the left side of the seat 100 (the right side of the passenger P in FIG. 1), and the second storage case 42 is provided or, the right side of the seat 100 (the left side of the passenger P in FIG. 1) in the traveling direction of the vehicle 1. The first inflator 51a and the first airbag body 101 are stored in the first storage case 41. Meanwhile, the second inflator 51b and the second airbag body 102 are stored in the second storage case 42.

Figure 3A:
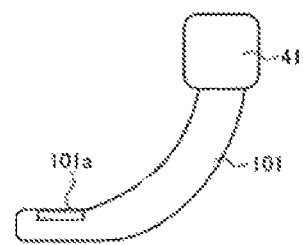
FIG. 3A and FIG. 3C are top views illustrating a deploying airbag body.
Figure 3B:
FIG. 3B and FIG. 3D are front views illustrating a deploying airbag body.
Figure 3C:
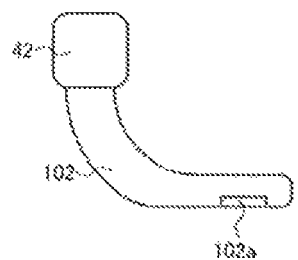
Figure 3D:
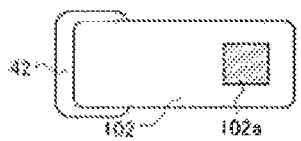

FIG. 3A is a top view illustrating the first airbag body 101 deploying when the passenger protection apparatus according to the embodiment is actuated. FIG. 3B is a front view illustrating the first airbag body 101 deploying when the passenger protection apparatus according to the embodiment is actuated. FIG. 3C is a top view illustrating the second airbag body 102 deploying when the passenger protection apparatus according to the embodiment is actuated. FIG. 3D is a front view illustrating the second airbag body 102 deploying when the passenger protection apparatus according to the embodiment is actuated.

<First Inflator 51a>

The first inflator 51a is configured to generate gas upon receiving an actuating signal sent based on the detection of the collision detector, and to supply the generated gas to the first airbag body 101 to expand the first airbag body 101.

<Second Inflator 51b>

Like the first inflator 51a, the second inflator 51b is configured to generate gas upon receiving an actuating signal sent based on the detection of the collision detector, and to supply the generated gas to the second airbag body 102 to expand the second airbag body 102.

<First Airbag Body 101>

The first airbag body 101 is configured to expand and deploy by the gas injected from the first inflator 51a. One end (fixed side) of the first airbag body 101 is supported by the first storage case 41, and, when the first airbag body 101 is actuated, the other end (deployment side) is deployed to surround the sitting position of the passenger P. The first airbag body 101 includes an adhesive area 101a on which adhesive is applied. The adhesive area 101a is provided on the inward surface facing the passenger P (facing the rear side of the vehicle 1) near the leading end portion (deployment side) of first airbag body 101. That is, adhesive is applied to a predetermined portion of the first airbag body 101, and when the first airbag body 101 is deployed, the predetermined portion adheres to an adherend. This adhesive has no adhesive force or a low adhesive force at ordinary temperatures, but increases the adhesive force when the temperature is raised.

<Second Airbag Body 102>

The second airbag body 102 is configured to expand and deploy by the gas injected from the second inflator 51b. One end (fixed side) of the second airbag body 102 is supported by the second storage case 42, and, when the second airbag body 102 is actuated, the other end (deployment side) is deployed to surround the sitting position of the passenger P. The second airbag body 102 includes an adhesive area 102a on which adhesive is applied. The adhesive area 102a is provided on the outward surface opposite to the passenger P (facing the front side of the vehicle 1) near the leading end portion (deployment side) of the second airbag body 102. That is, like the first airbag body 101, adhesive is applied to a predetermined portion of the second airbag body 102, and when the second airbag body 102 is deployed, the predetermined portion adheres to an adherend.

Like the adhesive of the first airbag body 101, this adhesive has no adhesive force or a low adhesive force at ordinary temperatures, but increases the adhesive force when the temperature is raised. The adhesive applied to the first airbag body 101 and the adhesive applied to the second airbag body 102 may be different in property. For example, the adhesive applied to the first airbag body 101 may exert its adhesive force at a high temperature, and the adhesive applied to the second airbag body 102 may exert its adhesive force at a lower temperature than the first airbag body 101.

Here, by actuating the second inflator 51b slightly earlier than when the first inflator 51a is actuated, the second airbag body 102 is deployed earlier than when the first airbag body 101 is deployed. By this means, the first airbag body 101 and the second airbag body 102 can successfully adhere to one another at a desired position.

In addition, in the embodiment, each of the first airbag body 101 and the second airbag body 102 includes the adhesive area on which adhesive is applied, but the disclosure is not limited to this. One of the first airbag body 101 and the second airbag body 102 may include the adhesive area, and the other may not include the adhesive area and therefore adhesive is not applied to the other. In this case, one of the airbag body 101 and the airbag body 102 which does not include the adhesive area has a corresponding area made of a material or formed in a shape which can easily adhere to the adhesive area. By this means, the first airbag body 101 and the second airbag body 102 can more successfully adhere to one another.

<Operation of Passenger Protection Apparatus 30>

In the passenger protection apparatus 30, when the collision detector detects or predicts a collision of the vehicle 1, an actuating signal is first sent to the second inflator 51b to actuate the second inflator 51b, and next an actuating signal is sent to the first inflator 51a to actuate the first inflator 51a.

Upon receiving the actuating signal sent based on the detection or prediction of a collision by the collision detector, the second inflator 51b generates gas and supplies the gas to the second airbag body 102. When the second airbag body 102 is supplied with the gas from the second inflator 51b, the second airbag body 102 expands and protrudes from the second storage case 42. Then, the second airbag body 102 spreads from the right to surround the passenger P and deploys in front of the passenger P.

Next, upon receiving an actuating signal sent based on the detection or prediction of a collision by the collision detector, the first inflator 51a generates gas and supplies the gas to the first airbag body 101. When the first airbag body 101 is supplied with the gas from the first inflator 51a, the first airbag body 101 expands and protrudes from the first storage case 41. Then, the first airbag body 101 spreads from the left to surround the passenger P and deploys in front of the passenger P.

Then, the adhesive applied to the adhesive area 102a of the second airbag body 102 is melted by the heat of the gas inputted from the second inflator 51b, and then the adhesive area 102a of the second airbag body 102 adheres to the inward surface of the first airbag body 101 facing the rear side of the vehicle 1. Also, the adhesive applied to the adhesive area 101a of the first airbag body 101 is melted by the heat of the gas inputted from the first inflator 51a, and then the adhesive area 101a of the first airbag body 101 adheres to the outward surface of the second airbag body 102 facing the front side of the vehicle 1.

As described above, in the passenger protection apparatus 30 according to the embodiment, the adhesive exerts its adhesive function by the heat of the gas from the inflator 50, so that the first airbag body 101 and the second airbag body 102 can adhere to one another. Therefore, it is possible to surely hold the passenger P on the seat 10 in a collision, and cope with various types of collisions in different directions, and consequently to improve the protection performance.

In the passenger protection apparatus 30 according to the embodiment, adhesive is applied to the inward surface of the first airbag body 101 facing the passenger F and the outward surface of the second airbag body 102 opposite to the passenger P. However, the disclosure is not limited to this. Adhesive may be applied to the outward surface of the first airbag body 101 opposite to the passenger P, and the inward surface of the second airbag body 102 facing the passenger P. In this case, it is preferred that the first airbag body 101 is first deployed, and next the second airbag body 102 is deployed. Alternatively, adhesive may be applied to both the inward surface facing the passenger P and the outward surface opposite to the passenger P of each of the first airbag body 101 and the second airbag body 102. In this case, either of the first airbag body 101 and the second airbag body 102 may be deployed first, or they may be deployed at the same time.

<One-Side Airbag>

Figure 4:
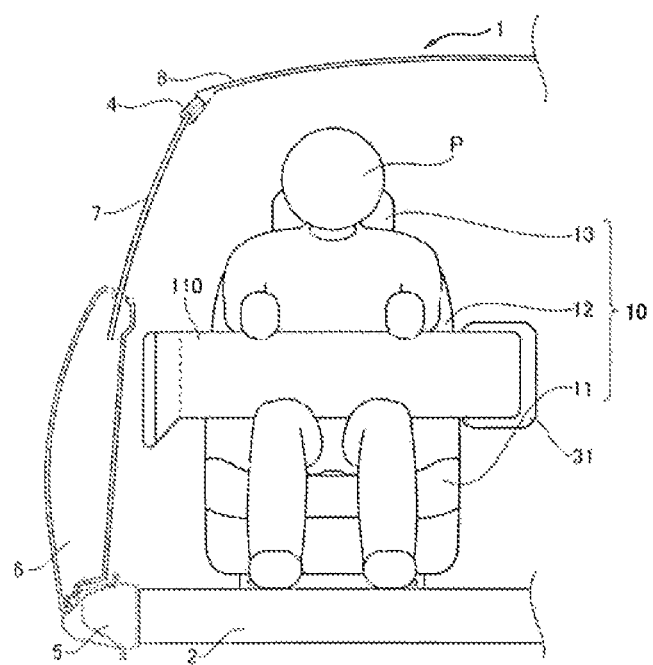
FIG. 4 is a cross-sectional view schematically illustrating the vehicle equipped with the passenger protection apparatus including the airbag body deploying from one side of a passenger

In the above-described embodiment, the first airbag body 101 of the passenger protection apparatus 30 is provided on the left side of the passenger P, and the second airbag body 102 of the passenger protection apparatus 30 is provided on the right side of the passenger P. However, the disclosure is not limited to this. The airbag body may be provided on only one side of the passenger P. To be more specific, as illustrated in FIG. 4, a passenger protection apparatus 31 may be provided on the left side of the seat 10 (on the right side of the passenger P in FIG. 4), and an inflator and an airbag body 110 may be provided in the passenger protection apparatus 31.

Upon receiving an actuating signal sent based on the detection of the collision detector, the inflator supplies gas to the airbag body 110. When the airbag body 100 is not actuated, it is compactly folded. An adhesive area is provided near the leading end portion of the airbag body 110, and adhesive is applied to the adhesive area. Then, when the airbag body 110 is supplied with the gas from the inflator, the airbag body 110 is deployed to surround the sitting position of the passenger P. Then, the adhesive is melted by the heat of the gas from the inflator, so that the adhesive area adheres to the front door 6.

By this means, in the passenger protection apparatus 31, the adhesive exerts its adhesive function by the heat of the gas from the inflator, and therefore it is possible to surely hold the passenger P on the seat 10, and consequently to improve the protection performance.

<Long Combustion Gas Passage>

Figure 5:
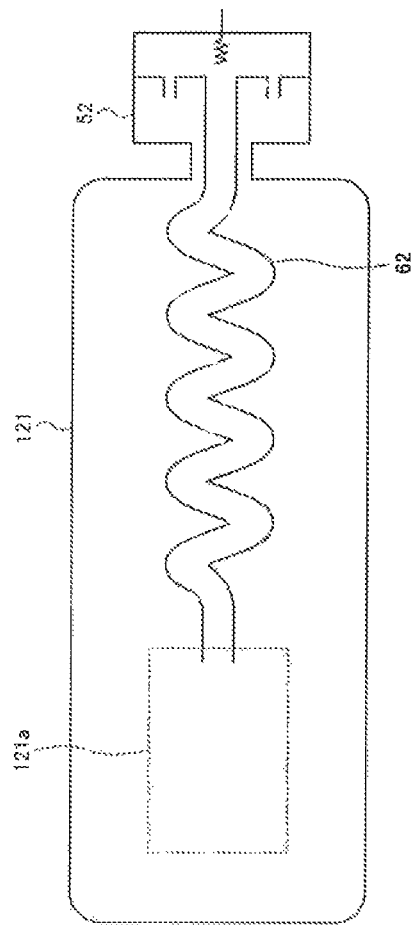
FIG. 5 is a cross-sectional view illustrating an inflator and an airbag body including a long combustion gas passage.

Next, a configuration will be described where the gas from the inflator is outputted separately into combustion gas and pressurized gas, and the combustion gas with a higher temperature is supplied to the adhesive area after the pressurized gas. FIG. 5 is a cross-sectional view illustrating an inflator and an airbag body.

With the embodiment, a first inflator 52 and a first airbag body 121 are stored in a first storage case, and a second inflator and a second airbag body (not shown) are stored in a second storage case. Here, the second inflator and the second airbag body are the same as the first inflator 52 and the first airbag body 121 except the right and the left are in reverse, and the front and the rear are in reverse in part (adhesive area), and therefore the description is omitted.

<First Inflator 52>

Upon receiving an actuating signal sent based on the detection of the collision detector, the first inflator 52 generates gas. The first inflator 52 is provided with ignition agent and gas generant. The ignition agent is agent for ignition. The ignition agent is ignited when the first inflator 52 receives an actuating signal sent based on the detection of the collision detector, and generates combustion gas with a high temperature, for example, 400 to 600 degrees Celsius. The gas generant generates pressurized gas to expand the first airbag body 121 by using the combustion gas generated by the ignition agent. The temperature of the pressurized gas is lower than that of the combustion gas, for example, 100 to 200 degrees Celsius.

Here, the generated combustion gas is outputted to a combustion gas passage 62 having a route different from the route of the pressurized gas, and part of the combustion gas is used to generate pressurized gas by the gas generant. The generated pressurized gas is supplied to the first airbag body 121 to expand the first airbag body 121. Here, the combustion gas having been used to generate the pressurized gas by the gas generant is supplied to the first airbag body 121 with the generated pressurized gas.

The first airbag body 121 is similar to the above-described first airbag body 101. An adhesive area 121a on which adhesive is applied is provided on the inward surface of the first airbag body 121 facing the passenger P (facing the rear side of the vehicle 1) near the leading end portion (deployment side) of the first airbag body 121. This adhesive has no adhesive force or a low adhesive force at ordinary temperatures, but increases the adhesive force when the temperature is higher than that of the adhesive applied to the first airbag body 101, for example, 400 degrees Celsius.

The combustion gas passage 62 is provided in the first airbag body 121, and configured to connect the first inflator 52 to the vicinity of the adhesive area 121a of the first airbag body 121 near. In addition, the combustion gas passage 62 is, for example, a serpentine passage, and therefore has a length longer than the actual distance from the first inflator 52 to the vicinity of the adhesive area 121a of the first airbag body 121.

By this means, the combustion gas with a higher temperature (e.g., 400 to 600 degrees Celsius) than the pressurized gas (e.g., 100 to 200 degrees Celsius) is delivered to the adhesive area 121a of the first airbag body 121 after the pressurized gas. Therefore, it is possible to melt the adhesive to improve the adhesive force after the first airbag body 121 has been sufficiently expanded by the pressurized gas and desirably deployed. Consequently, it is possible to prevent the first airbag body 121 from adhering at an undesired position during the deployment. By this means, the first airbag body 121 can adhere to the second airbag body at a desired position, and therefore it is possible to surely hold the passenger P on the seat 10 and improve the protection performance.

In the embodiment, the combustion gas passage 62 is provided in the first airbag body 121, but the disclosure is not limited to this. The combustion gas passage 62 may be provided outside the first airbag body 121. In addition, the second airbag body and the first airbag body 121 are the same except the right and the left are in reverse, and the front and rear are in reverse in part (adhesive area), and therefore the description is omitted.

<Control Valve>

Figure 6:
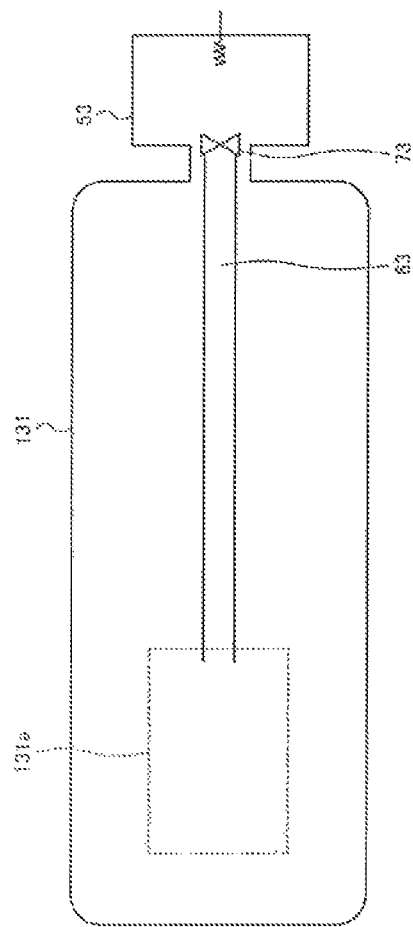
FIG. 6 is a cross-sectional view illustrating an inflator and an airbag body when a control valve is used in a gas passage.

Next, a configuration where a control valve is used in a passage to introduce the gas from the inflator into the adhesive area will be described. FIG. 6 is a cross-sectional view illustrating an inflator and an airbag body when a control valve is used in a gas passage.

With the embodiment, a first inflator 53 and a first airbag body 131 are provided in a first storage case, and a second inflator and a second airbag body (not shown) are provided in a second storage case. Here, the second inflator and the second airbag body are the same as the first inflator 53 and the first airbag body 131 except the right and the left are in reverse, and the front and the rear are in reverse in part (adhesive area), and therefore the description is omitted. A gas passage 63 is provided in the first airbag body 131, and a control valve 73 is provided in an inlet of the gas passage 63.

<First Inflator 53>

The first inflator 53 ignites explosives upon receiving an actuating signal sent based on the detection or prediction of a collision of the vehicle 1 by the collision detector, and generates gas by the chemical reaction due to combustion. The gas generated by the first inflator 53 is injected into the first airbag body 131 and supplied to the gas passage 63.

<Gas Passage 63>

The gas passage 63 is provided in the first airbag body 131 and configured to connect the first inflator 53 to the vicinity of an adhesive area 131a of the first airbag body 131. The gas passage 63 allows the gas flowing from the first inflator 53 to be outputted to the vicinity of the adhesive area 131a of the first airbag body 131. In addition, a control valve 73 is provided at an inlet of the gas passage 63 which is open to the first inflator 53.

<Control Valve 73>

The control valve 73 is provided at the inlet of the gas passage 63 which is open to the first inflator 53. The control valve 73 is a selector valve configured to select whether to flow the gas outputted from the first inflator 53 into the gas passage 63. That is, the control valve 73 is configured to open and close the passage. The control valve 73 is opened after the first airbag body 131 is deployed, and guides the gas generated by the first inflator 53 to the vicinity of the adhesive area 131a of the first airbag body 131 through the gas passage 63. Here, the operation of the control valve 73 is controlled by the ECU, but the disclosure is not limited this. The operation of the control valve 73 may be switched based on the magnitude of the pressure at which the gas is introduced.

To be more specific, when the pressure is equal to or lower than a predetermined value, the control valve 73 is closed regardless of the control of the ECU to inhibit the gas from flowing from the first inflator 53 into the gas passage 63. On the other hand, when the pressure is higher than the predetermined value, the control valve 73 is opened to allow the gas to flow from the first inflator 53 into the gas passage 63. In addition, the first inflator 53 may change the pressure of the gas on the way. For example, the first inflator 53 may first generate gas with a predetermined pressure, and then may further generate gas to increase the pressure of the gas to a value higher than the predetermined pressure.

With this configuration, when the collision detector detects or predicts a collision of the vehicle 1, the first inflator 53 is first actuated to inject the gas generated by the first inflator 53 into the first airbag body 131, so that the first airbag Body 131 is expanded and deployed. As the first airbag body 131 is expanded and deployed, the control valve 73 is opened to flow the gas generated by the first inflator 53 into the gas passage 63. Then, the gas flows through the gas passage 63 and is outputted to the vicinity of the adhesive area 131*a* of the first airbag body 131.

When the gas generated by the first inflator 53 is outputted to the vicinity of the adhesive area 131*a* of the first airbag body 131, the adhesive applied to the adhesive area 131*a* is melted by the heat of the gas, and exerts its adhesive force. Likewise, the second inflator is actuated to expand and deploy the second airbag body. The adhesive applied to the adhesive area of the second airbag body is melted by the heat of the gas, and exerts its adhesive force. By this means, the first airbag body 103 and the second airbag body adhere to one another, and therefore it is possible to surely held the passenger P and improve the protection performance.

<Surface on Which Adhesive is Applied When Airbag Body is Stored>

Next, the form of an airbag body and the surface on which adhesive applied when the airbag body is stored will be described. The passenger protection apparatus includes a first airbag body and a second airbag body symmetrically provided on each side of passenger P, and hereinafter, the first airbag body provided on the left side of the passenger P and stored in the first storage case 41 will be described. Here, the airbag body of the passenger protection apparatus provided on only one side of the passenger may be a first airbag body described later.

<Rolled for Storage>

FIG. 7A is a top cross-sectional view illustrating an airbag body stored. FIGS. 7B-7C are top views illustrating the airbag body deploying. As illustrated in FIG. 7A, a first inflator 54 and a first airbag body 141 are stored in a first storage case 41.

With the embodiment, the first airbag body 141 is rolled (coiled) and compactly stored in the first storage case 41. In addition, adhesive is applied to only the outward surface of the rolled first airbag body 141.

When the gas is injected from the first inflates 54 into the first airbag body 141, the first airbag body 141 is expanded from its base end, and gradually unrolled. Here, the adhesive is applied to only the outward surface of the rolled first airbag body 141, and therefore, as the first airbag body 141 is unrolled by injecting the gas into the first airbag body 141, the adhesive force is increased only on the outward surface. That is, the adhesive is directly applied to the outward surface of the relied first airbag body 141, and therefore the heat of the gas is transferred to the adhesive to increase the adhesive force. On the other hand, the heat of the gas is not directly transferred to the adhesive facing the inward surface, and therefore the temperature of the adhesive is not raised to increase the adhesive force. Moreover, it takes a long time to raise the temperature from when the gas flows into the first airbag body 141, and therefore it is possible to unroll the first airbag body 141 before the adhesive force is increased, and consequently to successfully deploy the first airbag body 141.

<Folded for Storage>

Figures 8A, 8B, 8C:
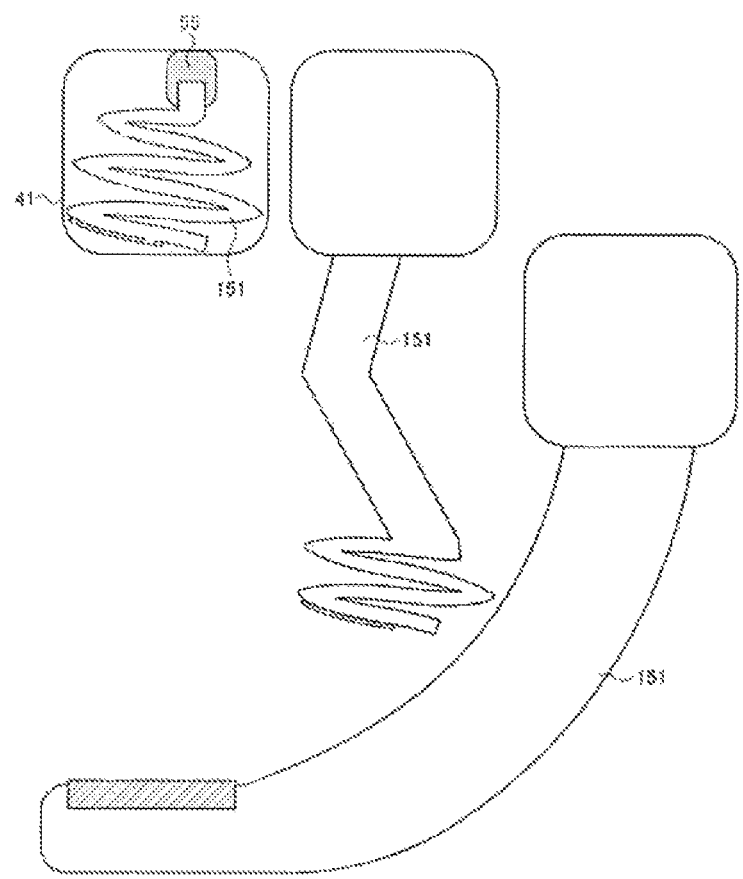
FIG. 8A and FIG. 8D are top cross-sectional views illustrating an airbag body stored.
FIG. 8B and FIG. 8C are top views illustrating the airbag body deploying.

Next, a configuration where an airbag body is folded for storage will be described. FIG. 8A is a top cross-sectional view illustrating a first airbag body in a zigzag manner and stored. FIGS. 8B-8C are top views illustrating the first airbag body deploying.

Figure 8D:
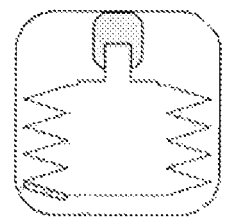

In the embodiment, the airbag body is folded in a zigzag manner for storage, but the disclosure is not limited to this. The airbag body may be accordion-folded for storage as described later. FIG. 8D is a top cross-sectional view illustrating the accordion-folded first airbag body for storage. As illustrated in FIG. 8A, a first inflator 55 and a first airbag body 151 are stored in the first storage case 41.

With the embodiment, the first airbag body 151 is folded in a zigzag manner and compactly stored in the first storage case 41. Adhesive is applied to only the leading end portion of the first airbag body 151.

When the gas is injected from the first inflator 55 into the first airbag body 151, the first airbag body 151 is expanded from its base end of the zigzag portion, and gradually unfolded. Then, when most of the first airbag body 151 is unfolded and deployed sufficiently to hold the passenger P, the adhesive area provided in the leading end portion is supplied with the gas. When the leading end portion of the first airbag body 151 is supplied with the gas, the adhesive on the leading end portion of the first airbag body 151 is melted by the heat of the gas and exerts the adhesive force, so that the first airbag body 151 can adhere to the second airbag body.

By this means, it is possible to prevent the first airbag body 151 from adhering at an undesired position until the first airbag body 151 is deployed to hold the passenger P, and therefore to successfully adhere to the second airbag body at a desired position. Here, the first airbag body 151 may not be folded in a zigzag manner, but may be accordion-folded for storage. In addition, in the example illustrated in FIG. 8D, the adhesive is applied to only one surface of the accordion-folded first airbag body 151, which is the inward surface of the first airbag body 151 being deployed. The disclosure is not limited to this, and the adhesive may be applied to the entire leading end portion, or both tips of the front pleat of the accordion-folded airbag body.

Next, an embodiment of the disclosure will be described in which a configuration where an air chamber containing the adhesive area is separated from the other air chamber. In this embodiment, the second airbag body includes the adhesive area provided in the front of the second airbag body.

<Separated Air Chamber>

Figure 9:
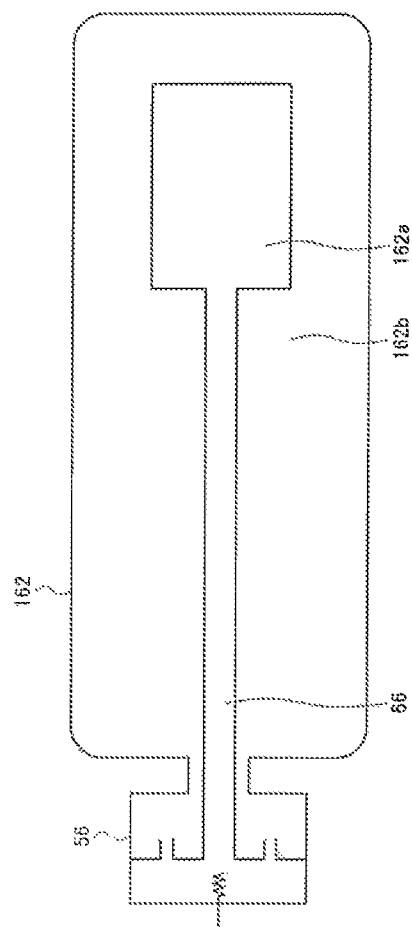
FIG. 9 is a cross-sectional view illustrating an airbag body having separated air chambers.

FIG. 9 is a cross sectional view illustrating the second airbag body including an air chamber with an adhesive area which is separated from the other air chamber.

As illustrated in FIG. 9, a second airbag body 162 includes a first air chamber 162*a* and a second air chamber 162*b*, and is coupled to a second inflator 56. In addition, a combustion gas passage 66 configured to allow communication between the first air chamber 162*a* and the second inflator 56 is provided in the second airbag body 162.

The first air chamber 162*a* includes an adhesive area formed on its surface, and is separated from the other area of the second airbag body 162, that is, separated from the second air chamber 162*b*. In addition, the first air chamber 162*a* is coupled to the combustion gas passage 66 that allows direct communication with the second inflator 56.

The second air chamber 162b occupies the area of the second airbag body 162 excluding the first air chamber 162a, and communicates with the second inflator 56.

<Second Inflator 56>

Upon receiving an actuating signal sent based on the detection of the collision detector, the second inflator 56 generates gas. The second inflator 56 is provided with ignition agent and gas generant. The ignition agent is ignited when the second inflator 62 receives an actuating signal sent based on the detection of the collision detector, and generates combustion gas with a high temperature, for example, 400 to 600 degrees Celsius. The gas generant generates pressurized gas to expand the second airbag body 162 by using the combustion gas generated by the ignition agent. The temperature of the pressurized gas is lower than that of the combustion gas, for example, 100 to 200 degrees Celsius.

The second inflator 56 is coupled to the second air chamber 162b of the second airbag body 162. The second inflator 56 injects the generated pressurized gas into the second air chamber 162b to expand the second airbag body 162. The second inflator 56 includes an inlet open to the combustion gas passage 66 in the area where the combustion gas is generated, that is, the area where the ignition agent is provided. By this means, the high-temperature combustion gas generated in the second inflator 56 flows into the combustion gas passage 66, and is introduced into the first air chamber 162a of the second airbag body 162.

With this configuration, the pressurized gas generated in the second inflator 56 is injected into the second air chamber 162b of the second airbag body 162 to expand the second airbag body 162; and the high-temperature combustion gas generated in the second inflator 56 flows into the first air chamber 162a to raise the temperature of the adhesive area, so that the adhesive is melted and exerts its adhesive force. Consequently, it is possible to surely hold the passenger P on the seat 10, and therefore improve the protection performance.

In the embodiment, the combustion gas passage 66 runs inside the second airbag body 162. The disclosure is not limited to this, and the combustion gas passage 66 may run outside the second airbag body 162. In addition, in the embodiment, the first air chamber 162a is completely separated from the second air chamber 162b. The disclosure is not limited to this, and the first air chamber 162a and the second air chamber 162b may not be separated from one another as long as the combustion gas generated in the second inflator 56 can be delivered to the first air chamber 162a, that is, (the rear surface of) the adhesive area.

<Adhesive Area with Vent Holes>

Figure 10:
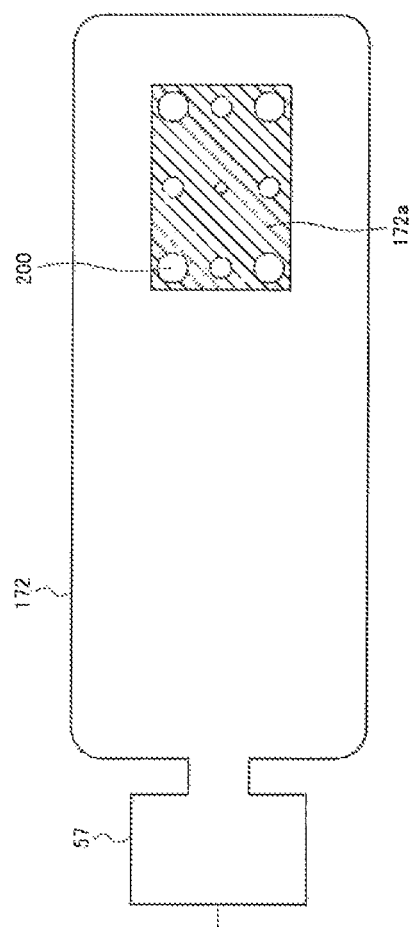
FIG. 10 is a side view illustrating an airbag body including an adhesive area with vent holes.

Next, an embodiment of the disclosure will be described with a configuration where vent holes are formed in the adhesive area of the airbag body to discharge the gas flowing into the adhesive area. FIG. 10 is a side view illustrating an airbag body including an adhesive area with vent holes.

As illustrated in FIG. 10, a plurality of vent holes 200 are formed in an adhesive area 172a of a second airbag body 172 according to this embodiment to discharge the gas flowing into the second airbag body 172. Among these vent holes 200, holes formed in the four corners are larger than holes near the sides, and the holes formed near the center is smaller than the holes near the sides.

In this way, the adhesive area 172a has the vent holes 200 to discharge the gas flowing into the second airbag body 172 from the vent holes 200. Therefore, it is possible to collect the gas near the vent holes 200 to raise the temperature near the vent holes 200. By this means, it is possible to raise the temperature of the adhesive area 172a to increase the adhesive force of the adhesive. Consequently, it is possible to surely hold the passenger P on the seat 10, and therefore to improve the protection performance. In addition, according to the embodiment, the vent holes formed in the four corners of the adhesive area are large, and the vent hole formed at the center is small. By this means, the amount of the gas flowing out of the adhesive area 172a is smaller in the vicinity of the center than in the periphery, and therefore it is possible to prevent inhibition of the adhesion of the second airbag body 172 due to the outflow of the gas.

In the embodiment, the vent holes 200 are provided in the adhesive area 172a. The disclosure is not limited to this, and the vent holes 200 may be provided near the adhesive area 172a. In this case, also it is possible to raise the temperature of the adhesive area 172a near the vent holes 200, and therefore to increase the adhesive force of the adhesive. Consequently, it is possible to improve the passenger protection performance. In addition, in the embodiment, the vent holes 200 formed in the four corners of the adhesive area 172a are large, and the vent hole 200 formed near the center is small. However, the disclosure is not limited to this, and the vent holes 200 formed in the four corners may be small, and the vent hole 200 formed near the center may be large; all the vent holes 200 may be the same in size; vent holes 200 formed in a specific direction may be large or small; and the vent holes 200 may be irregularly formed. Moreover, in the embodiment, the vent holes 200 are evenly disposed, but the disclosure is not limited to this. For example, the vent holes 200 may be disposed disproportionally in a specific direction.

<Position of Adhesive Area>

Figure 11A:
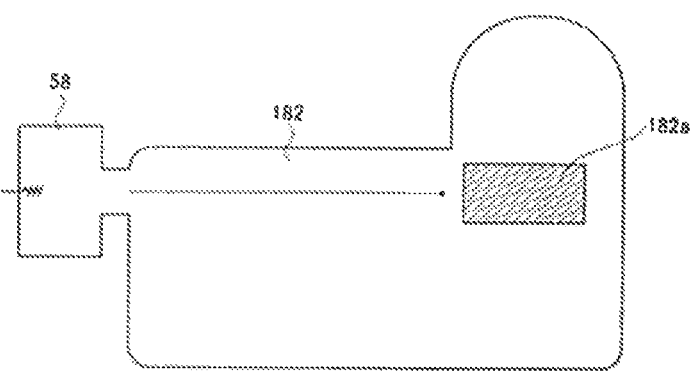
FIG. 11A and FIG. 11B are cross-sectional views illustrating the positions of adhesive areas.
Figure 11B:
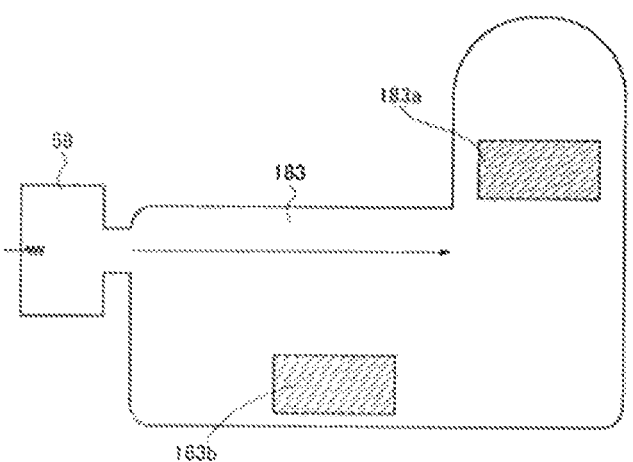

Next, the positions of adhesive areas will be described. FIG. 11A is a cross-sectional view illustrating a preferred position of an adhesive area of an airbag body. FIG. 11B is a cross sectional view illustrating a comparative example of FIG. 11A.

As illustrated in FIG. 11A, a second airbag body 182 includes an adhesive area 182a located on an extension of the output direction of the gas from a second inflator 58. T surface of the adhesive area 182a is provided on an extension of the output direction of the gas from the second inflator 58, but the disclosure is not limited to this. The inner wall surface of the second airbag body 182 located on an extension of the output direction of the gas from the second inflator 58 may function as the adhesive area 182a.

With this configuration, the high-temperature gas outputted from the second inflator 58 directly reaches the adhesive area 162a to readily raise the temperature of the adhesive area 182a. By this means, it is possible to effectively exert the adhesive function of the adhesive when the second airbag body 182 is deployed, and therefore to surely hold the passenger P on the seat 10 and improve the protection performance.

On the other hand, as illustrated in FIG. 11B, a second airbag body 183 includes an adhesive area 183a and an adhesive area 183b located out of an extension of the output direction of the gas from the second inflator 58. In this way, in the case where the adhesive area 183a and the adhesive area 183b are located out of an extension of the output direction of the gas from the second inflator 58, the heat of the gas from the second inflator 58 is removed in other areas, and therefore the temperature is decreased before the gas reaches the adhesive area 183a and the adhesive area 183b.

Consequently, the adhesive area 182a located on an extension of the output direction of the gas from the second inflator 58 is better than the adhesive areas 183a and 183b located out of an extension of the output direction of the gas from the second inflator 58, because it is possible to readily raise the temperature and effectively exerts the adhesive ability of the adhesion.

<Adhesive Applied to Folded Portions>

Figure 12:
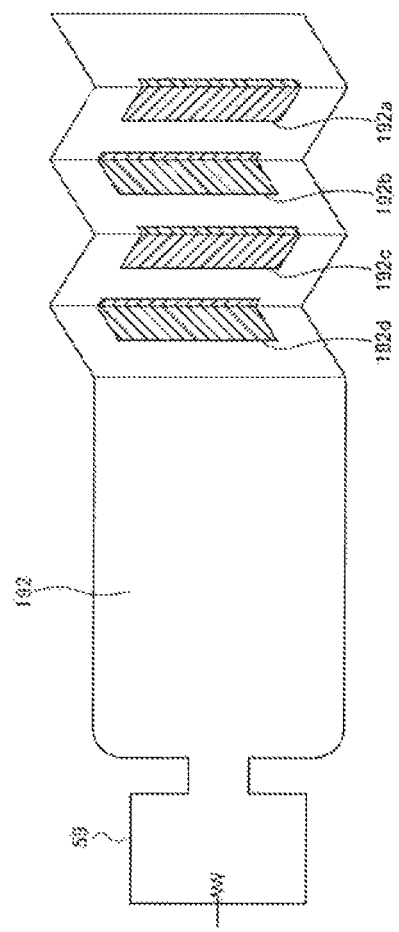
FIG. 12 is a schematic view illustrating an airbag body including adhesive areas provided on folded portions.

Next, an embodiment of the disclosure will be described with a configuration where an airbag body is folded in a zigzag manner and stored, and adhesive areas are provided on the folded portions will be described. FIG. 12 is a schematic view illustrating an airbag body deploying from a zigzag-folded state.

As illustrated in FIG. 12, a second airbag body 192 folded in a zigzag manner includes adhesive areas 192*a* to 192*d* provided on folded portions of the zigzag.

With this configuration, when the gas is injected from a second inflator 59 into the second airbag body 192, resistance is generated to increase the pressure every time the gas reaches a folded portion during the deployment of the second airbag body 192. When the pressure is equal to or higher than a predetermined value, a folded portion is unfolded, and then when resistance is generated at a next folded portion to increase the pressure, the next folded portion is unfolded.

As described above, in the case of the second airbag body 192 folded in a zigzag manner and stored, the pressure of the gas is increased at each of the folded portions to raise the temperature. In this way, it is possible to readily raise the temperature of the adhesive areas 192*a* to 192*d* provided on the folded portions. By this means, it is possible to effectively exert the adhesive function of the adhesive during the deployment of the second airbag body 192, and consequently to surely hold the passenger P on the seat 10 and improve the protection performance.

As described above, according to the above-described embodiments, the adhesive function of the adhesive is exerted by the heat of the gas from the inflator, so that the first airbag body and the second airbag body adhere to one another. Therefore, it is possible to surely hold the passenger P on the seat 10 in a collision, and cope with various types of collisions in all directions, and consequently to improve the protection performance.

The invention claimed is:

1. A passenger protection apparatus for a vehicle, the apparatus comprising:
   an inflator configured to generate gas upon receiving a predetermined actuating signal; and
   an airbag body configured to deploy from storage by supplying the gas from the inflator to the airbag body, the airbag body comprising a predetermined area on which adhesive is applied,
   wherein the inflator is configured to supply the gas to the airbag body so that an adhesive force of the adhesive is exerted by heat of the gas during deployment of the airbag body,
   wherein the airbag body is configured so that the deployed airbag body includes the predetermined area that adheres to an adherend different from the deployed airbag body at a desired position by the adhesive, wherein:
   the inflator comprises an ignition agent used for ignition to generate combustion gas, and a gas generant configured to generate pressurized gas to expand the airbag body by using the combustion gas, the pressurized gas having a lower temperature than the combustion gas; and the airbag body comprises a pressurized gas expansion region, and a combustion gas expansion region; and the predetermined area is provided in the combustion gas expansion region.

2. A passenger protection apparatus for a vehicle, the apparatus comprising:
   an inflator configured to generate gas upon receiving a predetermined actuating signal; and
   an airbag body configured to deploy from storage by supplying the gas from the inflator to the airbag body, the airbag body comprising a predetermined area on which adhesive is applied,
   wherein an adhesive force of the adhesive is exerted by heat of the gas from the inflator during deployment of the airbag body, so that the predetermined area adheres to an adherend at a desired position, and wherein:
   the inflator comprises an ignition agent used for ignition to generate combustion gas, and a gas generant configured to generate pressurized gas to expand the airbag body by using the combustion gas, the pressurized gas having a lower temperature than the combustion gas; and
   the airbag body comprises a combustion gas passage configured to deliver the combustion gas to the predetermined area through a route having a distance longer than a distance for which the pressurized gas is delivered to the predetermined area.

3. The passenger protection apparatus for a vehicle according to claim 2, wherein the combustion gas passage is serpentine configured.

4. The passenger protection apparatus for a vehicle according to claim 2, wherein the airbag body is configured so that the deployed airbag body includes the predetermined area that adheres to an adherend different from the deployed airbag body at a desired position by the adhesive.

5. A passenger protection apparatus for a vehicle, the apparatus comprising:
   an inflator configured to generate gas upon receiving a predetermined actuating signal; and
   an airbag body configured to deploy from storage by supplying the gas from the inflator to the airbag body, the airbag body comprising a predetermined area on which adhesive is applied,
   wherein an adhesive force of the adhesive is exerted by heat of the gas from the inflator during deployment of the airbag body, so that the predetermined area adheres to an adherend at a desired position, and wherein:
   the inflator comprises an ignition agent used for ignition to generate combustion gas, and a gas generant configured to generate pressurized gas to expand the airbag body by using the combustion gas, the pressurized gas having a lower temperature than the combustion gas;
   the airbag body comprises a pressurized gas expansion region, and a combustion gas expansion region; and
   the predetermined area is provided in the combustion gas expansion region.

6. The passenger protection apparatus for a vehicle according to claim 5, the apparatus further comprising a selector valve disposed at a passage through which the gas is supplied from the inflator to the predetermined area of the airbag body,
   wherein the selector valve is opened after the airbag body is deployed, and guides the gas from the inflator to the predetermined area of the airbag body.

7. The passenger protection apparatus for a vehicle according to claim 5, wherein the airbag body is rolled for storage, and the adhesive is applied to an outward surface of the rolled airbag body.

8. The passenger protection apparatus for a vehicle according to claim 5, wherein the airbag body is folded for storage, and the adhesive is applied to a leading end portion of the airbag body.

9. The passenger protection apparatus for a vehicle according to claim 5, wherein the airbag body comprises a vent hole in or near the predetermined area to discharge the gas.

10. The passenger protection apparatus for a vehicle according to claim 5, wherein the predetermined area of the airbag body is provided on an extension of an output direction of the gas from the inflator.

11. The passenger protection apparatus for a vehicle according to claim 5, wherein the airbag body is folded for storage, and the adhesive is applied to a folded portion.

\* \* \* \* \*